United States Patent
Asagi

(10) Patent No.: US 10,795,210 B2
(45) Date of Patent: Oct. 6, 2020

(54) LIQUID CRYSTAL PANEL AND LIQUID CRYSTAL DISPLAY DEVICE

(71) Applicant: SHARP KABUSHIKI KAISHA, Sakai, Osaka (JP)

(72) Inventor: Hiroaki Asagi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/580,624

(22) Filed: Sep. 24, 2019

(65) Prior Publication Data

US 2020/0103711 A1 Apr. 2, 2020

Related U.S. Application Data

(60) Provisional application No. 62/739,152, filed on Sep. 28, 2018.

(51) Int. Cl.
G02F 1/1337 (2006.01)
G02F 1/1335 (2006.01)
G02F 1/1347 (2006.01)

(52) U.S. Cl.
CPC ...... *G02F 1/133711* (2013.01); *G02F 1/1347* (2013.01); *G02F 1/133528* (2013.01); *G02F 1/133788* (2013.01); *G02F 2001/133738* (2013.01); *Y10T 428/1005* (2015.01)

(58) Field of Classification Search
CPC ......... Y10T 428/1005; G02F 1/133711; G02F 1/133788; G02F 2001/133738
See application file for complete search history.

(56) References Cited

U.S. PATENT DOCUMENTS

| | | | | |
|---|---|---|---|---|
| 2007/0115412 A1* | 5/2007 | Tsuchiya | ............. | G02F 1/13363 349/117 |
| 2014/0211132 A1* | 7/2014 | Miyachi | ............ | G02F 1/133788 349/99 |
| 2016/0349561 A1* | 12/2016 | Shiina | ................... | G02F 1/1368 |

FOREIGN PATENT DOCUMENTS

JP 2016-224298 A 12/2016

* cited by examiner

*Primary Examiner* — Sophie Hon
(74) *Attorney, Agent, or Firm* — ScienBiziP, P.C.

(57) ABSTRACT

A liquid crystal panel includes substrates, a liquid crystal layer between the substrates, a spacer provided on an opposite surface of one of the substrates, and an alignment film provided on an opposite surface of another substrate. The display surface is curved around a curved axis or formed to be bendable around the curved axis, and the spacer directly or indirectly abuts on the alignment film provided on the opposite surface of the other substrate. The alignment film is a horizontal alignment film that contains a polymer having an alkylene chain structure having two or more carbon atoms in a main chain and allows liquid crystal molecules in the liquid crystal layer to be aligned horizontally to the alignment film, and in the alignment film provided on the opposite surface of the other substrate, the polymer is aligned such that the alkylene chain structure extends parallel to the curved axis.

8 Claims, 11 Drawing Sheets

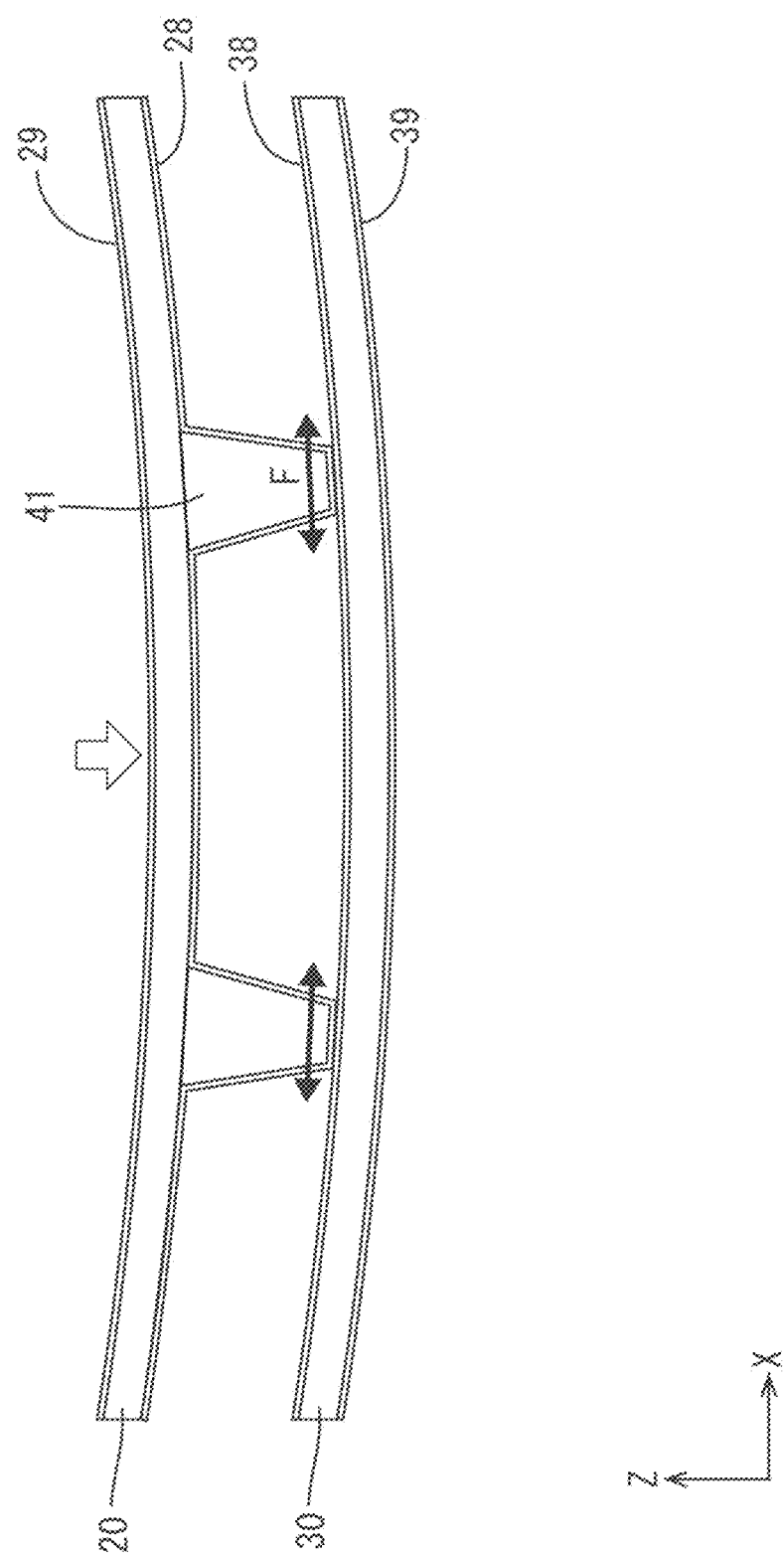

LIQUID CRYSTAL PANEL AND LIQUID CRYSTAL DISPLAY DEVICE

CROSS REFERENCE TO RELATED APPLICATION

This application claims priority from U.S. Provisional Patent Application No. 62/739,152 filed on Sep. 28, 2018. The entire contents of the priority application are incorporated herein by reference.

TECHNICAL FIELD

The technology disclosed herein relates to a liquid crystal panel and a liquid crystal display device.

BACKGROUND ART

A liquid crystal panel is widely used in various image display devices, and has a configuration in which a liquid crystal layer is disposed between a pair of substrates disposed opposite to each other. In these liquid crystal display devices, an electric signal is supplied to the liquid crystal layer to control the alignment of liquid crystal molecules, thereby changing optical characteristics (light transmittance and reflectivity) of the liquid crystal panel and displaying an image on the display surface thereof. In recent years, a liquid crystal panel having a curved display surface is used for the purpose of enhancing design properties of an image display device or expressing a unique viewing sensation (for example, immersion feeling in a large display device). In addition, for the purpose of enhancing the handling convenience (for example, handling property, portability, or storage property) of the image display device, a liquid crystal panel in which the whole or a part of the liquid crystal panel is formed to be bendable has also been developed. The liquid crystal panel having a curved shape is manufactured by manufacturing a liquid crystal panel having a flat shape and then forcibly bending the liquid crystal panel. In addition, the liquid crystal panel formed to be bendable is used while reversibly changing the whole or a part of the liquid crystal panel from the flat shape to the curved shape.

However, in the liquid crystal panel, in order to align the liquid crystal molecules in the liquid crystal layer, innermost layer sides (liquid crystal layer sides) on opposite surfaces of each substrate are provided with, for example, a so-called polyimide-based alignment film which is formed by applying a liquid crystal alignment treatment agent containing a polyimide precursor such as polyamic acid or a solution of a soluble polyimide as a main component onto a substrate and the like and firing the liquid crystal alignment treatment agent. In addition, in order to keep a thickness (cell gap) of the liquid crystal layer constant, a spacer may be formed to protrude on at least one of the pair of substrates disposed opposite to each other. A tip of the spacer directly or indirectly abuts on the alignment film which is formed on the opposite surface of the other substrate, so that a distance between the pair of substrates is defined. When such a liquid crystal panel is changed from the flat shape to the curved shape, the spacer is displaced relative to the other substrate, and the abutment position on the alignment film moves. At this time, the tip of the spacer moves while directly or indirectly rubbing the surface of the alignment film formed on the opposite surface of the other substrate. Therefore, when the hardness of the alignment film is not sufficient, a spacer mark remains on the alignment film. When the spacer mark occurs, a light transmission state of the liquid crystal panel is disturbed in this portion, which results in light leakage and the like. Therefore, for example, Japanese Unexamined Patent Application Publication No. 2016-224298 discloses a curved liquid crystal display device in which a reduction in contrast due to light leakage caused by the spacer mark is suppressed by providing a light shielding film, which is provided at an arrangement position of the spacer in the liquid crystal panel, at a position covering an alignment film including the spacer mark.

As described above, when the tip of the spacer rubs against the alignment film formed on the other substrate, not only the spacer mark occurs, but also scraps formed of the scraped alignment film are generated. When the scraps float in the liquid crystal layer, the scraps are recognized as bright spots, which results in display defects.

SUMMARY

The present technology has been completed in view of the above circumstances, and an object of the present technology is to suppress a bright spot from occurring due to scraps of an alignment film in a liquid crystal panel having a curved shape or a liquid crystal panel formed to be bendable.

A liquid crystal panel including a display surface displaying an image according to the technology described herein includes a pair of substrates disposed to face each other in a state where plate surfaces thereof are spaced apart from each other; a liquid crystal layer disposed between the pair of substrates; a spacer provided on an opposite surface of at least one of the pair of substrates; and an alignment film provided on an opposite surface of at least another substrate of the pair of substrates, wherein the display surface is curved around a curved axis or formed to be bendable around the curved axis, the spacer directly or indirectly abuts on the alignment film provided on the opposite surface of the other substrate, the alignment film is a horizontal alignment film that contains a polymer having an alkylene chain structure having two or more carbon atoms in a main chain and allows liquid crystal molecules in the liquid crystal layer to be aligned horizontally to the alignment film, and in the alignment film provided on the opposite surface of the other substrate, the polymer is aligned such that the alkylene chain structure extends parallel to the curved axis.

According to the present technology, it is possible to obtain a liquid crystal display device which includes a curved liquid crystal panel or a liquid crystal panel formed to be bendable, and suppresses the reduction in display quality.

BRIEF DESCRIPTION OF THE DRAWINGS

FIG. 5 is a schematic cross-sectional view showing an appearance in which an alignment film is rubbed by a spacer when the liquid crystal panel is curved.

DETAILED DESCRIPTION

Figure 1:
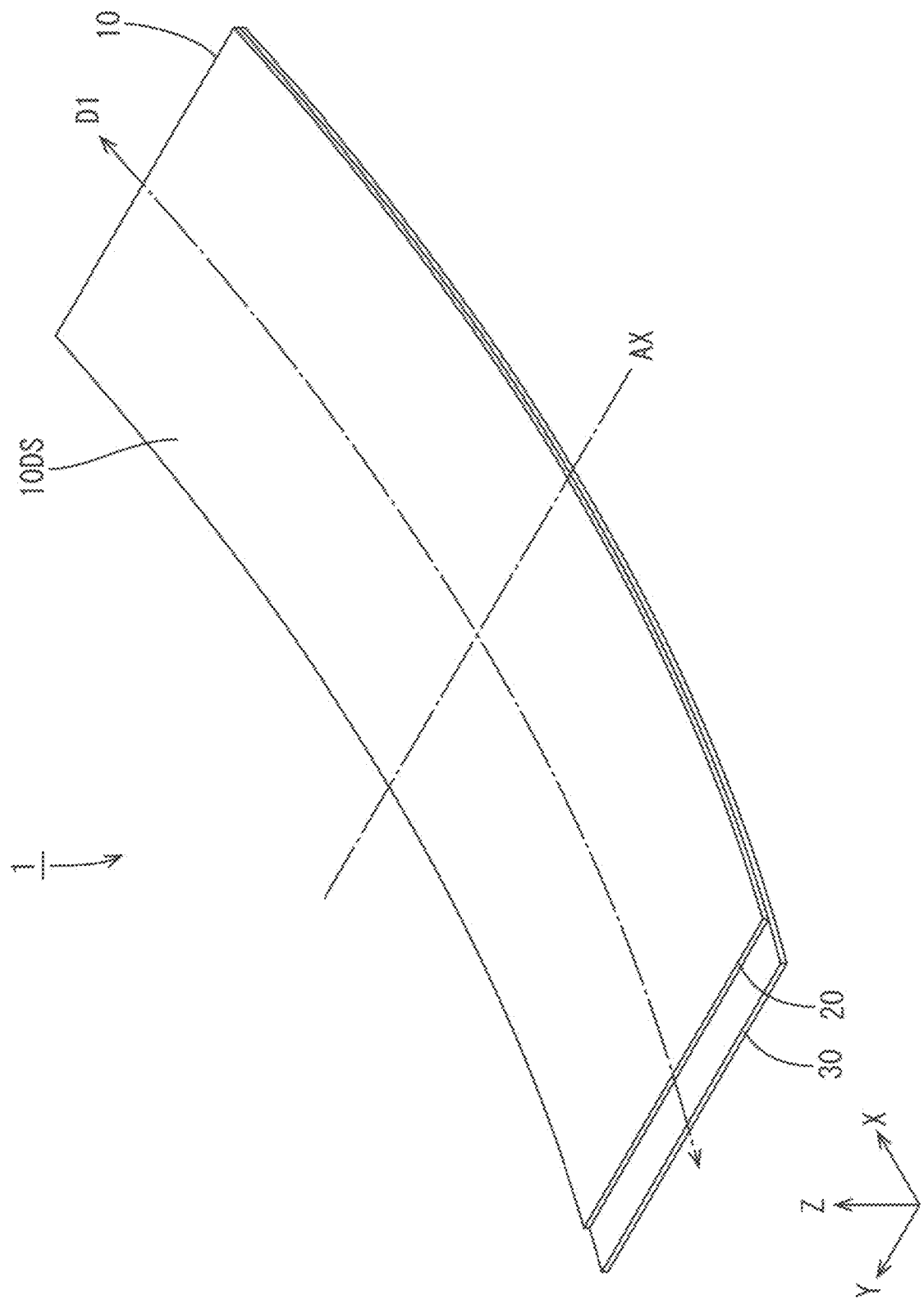
FIG. 1 is a schematic diagram of a liquid crystal display device provided with a liquid crystal panel according to one embodiment.

Embodiments of the technology disclosed herein will be described with reference to the drawings. Note that an X axis, a Y axis, and a Z axis are shown in parts of each drawing, and directions of each axis are drawn to be the same direction in each drawing. Hereinafter, a front upper side of a page in FIG. 1 is referred to as a front side or a front surface side (back lower side of a page in FIG. 1 is referred to as a back side or a back surface side), and one member of the same members is given a reference symbol and the other members thereof are not given a reference symbol. Note that In each drawing, for convenience of explanation, a shape of each structure may be simplified, and some dimensions may be shown on a scale different from others.

Figure 2:
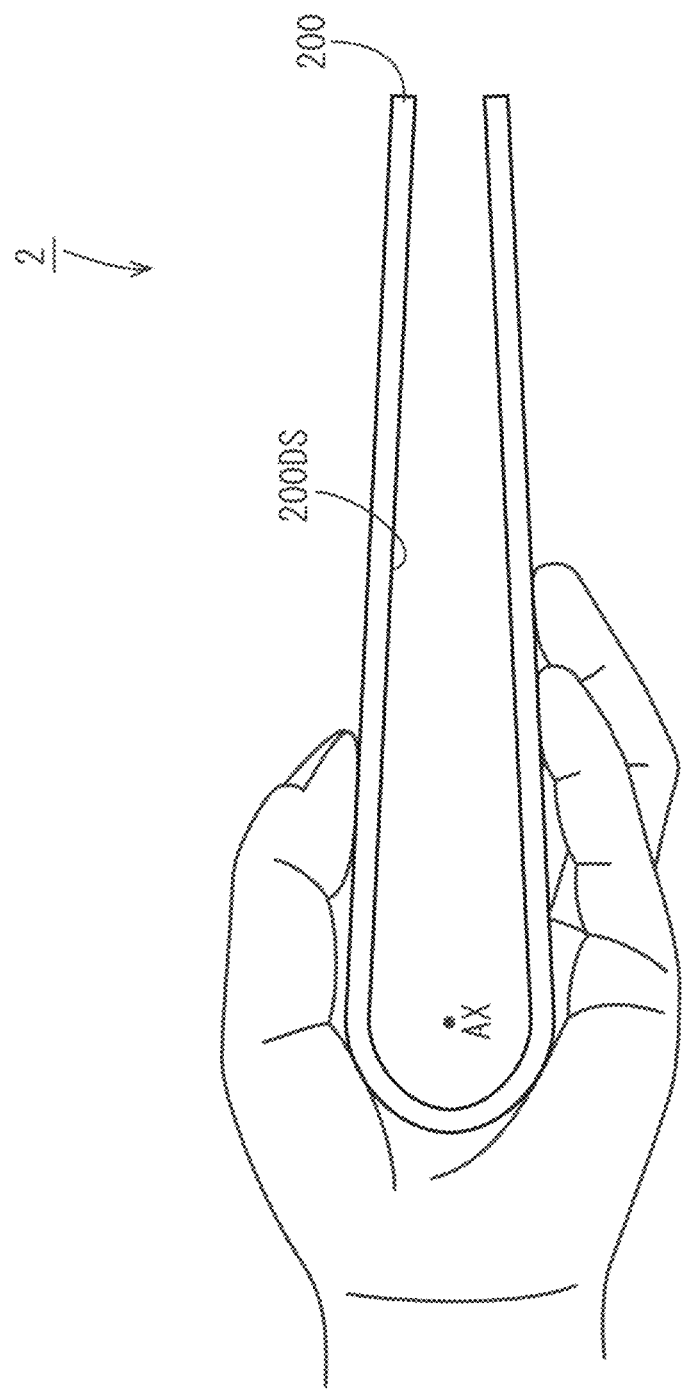
FIG. 2 is a schematic diagram of a liquid crystal display device provided with a liquid crystal panel according to another embodiment.
Figure 3:
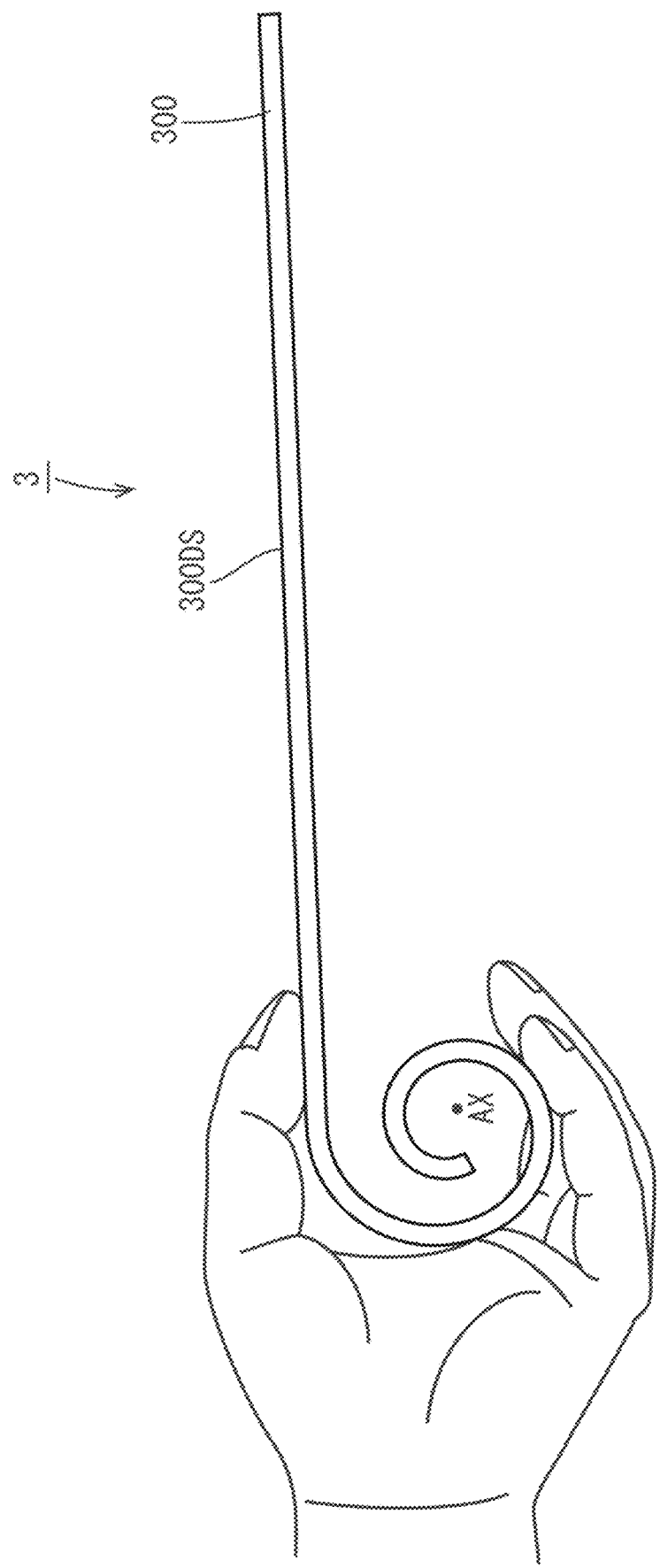
FIG. 3 is a schematic diagram of a liquid crystal display device provided with a liquid crystal panel according to still another embodiment.

FIG. 1 schematically shows an overview of a liquid crystal display device 1 including a liquid crystal panel 10 according to an embodiment of the technology disclosed herein. The liquid crystal panel 10 is used in a predetermined shape in which a display surface 10DS for displaying an image is curved and fixed. In addition, FIGS. 2 and 3 show a liquid crystal display device 2 and a liquid crystal display device 3 provided with a liquid crystal panel 200 and a liquid crystal panel 300 according to another embodiment of the technology disclosed herein. The liquid crystal panel 200 and the liquid crystal panel 300 have display surfaces 200DS and 300DS for displaying an image, and the whole or a part thereof is formed to be bendable, and is used while being reversibly deformed from a flat shape to a curved shape.

The liquid crystal display devices 1, 2, and 3 may be a transmissive liquid crystal display device to be irradiated with light in which, for example, a backlight device is provided on a back surface side of the liquid crystal panels 10, 200, 300. Although the backlight device is not shown, it is preferable that the backlight device is also formed into a curved shape to follow the liquid crystal panel 10 or is formed to be bendable to follow the liquid crystal panels 200 and 300 (however, the liquid crystal panels 10, 200, and 300 are not limited to those including a backlight device having such a shape). In addition, the present technology is also applicable to a reflective liquid crystal panel to which the backlight device is not attached. The liquid crystal display device is provided with a liquid crystal panel having a screen size of about several inches to several tens of inches, and can have various sizes from those constituting a portable terminal having a liquid crystal panel classified into a small size or a medium and small size to those having a liquid crystal panel with a screen size of several tens of inches or larger and classified into a medium size or a large size (ultra-large size).

The present technology is similarly applicable to the liquid crystal panel 10 having a curved shape, and the liquid crystal panels 200 and 300 which are formed to be bendable. Hereinafter, the liquid crystal panel 10 having a curved shape will be mainly described, and the liquid crystal panels 200 and 300 formed to be bendable will be described, if necessary.

As shown in FIG. 1, the liquid crystal panel 10 has a substantially rectangular plate shape as a whole, and is disposed such that a long side is parallel to an X axis and a short side is parallel to a Y axis. The liquid crystal panel 10 has a front plate surface serving as the display surface 10DS, and is curved around a virtual curved axis AX extending parallel to the Y axis at a position superimposed on a center of a long side in front of the display surface 10DS. That is, in the liquid crystal panel 10, a central part in a long-side direction (X-axis direction) in the display surface 10DS is retracted to the back surface side, and both end portions in the long-side direction are formed in a substantially arc shape protruding to the front surface side. With such a shape, when a display image is viewed from the front side surface of the display surface 10DS, a feeling of being immersed in the image (so-called immersion feeling) can be obtained. As shown in FIGS. 2 and 3, the liquid crystal panels 200 and 300 are formed to be bendable around the virtual curved axis AX. The curved axis AX in each of the liquid crystal panels 10, 200, and 300 may be disposed to extend parallel to the long side instead of the short side, and the curved axis AX may be disposed at a biased position instead of the centers of each side. In addition, the liquid crystal panel may be curved such that the display surface is disposed on an outer peripheral side of the liquid crystal panel. In the case where the liquid crystal panel has a plurality of curved axes AX, the curved axes AX are preferably disposed parallel to one another.

Figure 4:
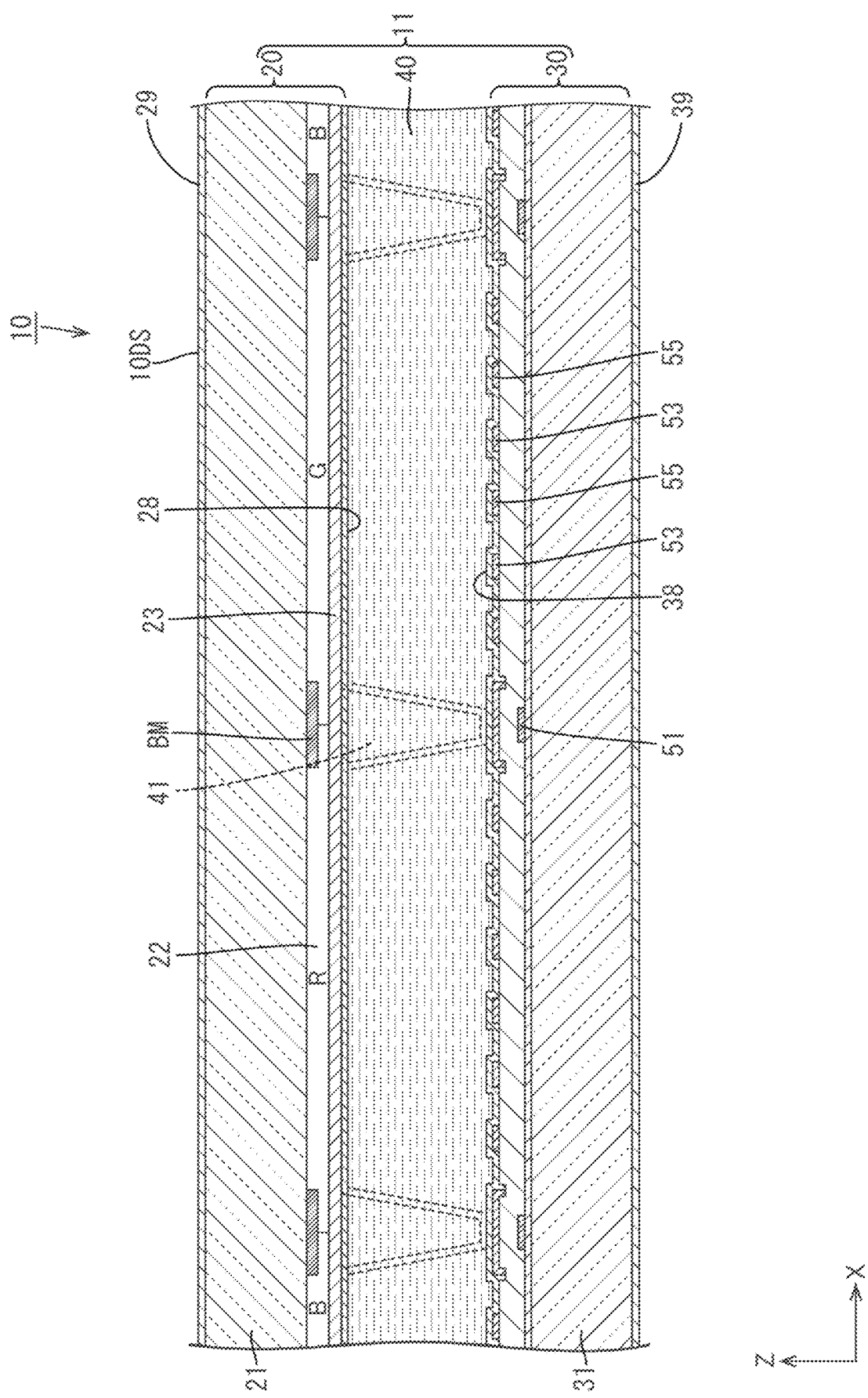
FIG. 4 is a schematic diagram showing an overview of an example of a cross-sectional configuration in a display area of the liquid crystal panel.

FIG. 4 is a schematic diagram showing an example of the cross-sectional configuration of the liquid crystal panel 10 in the flat state. The liquid crystal panel 10 can have a well-known schematic configuration, and mainly includes a liquid crystal cell 11 and a pair of polarizing plates 29 and 39 attached to plate surfaces on both outer sides of the liquid crystal cell 11, respectively. As the polarizing plates 29 and 39, for example, those in which a transparent film impregnated with iodine or a dye is stretched in one direction are used.

As shown in FIG. 4, the liquid crystal cell 11 has a structure in which a pair of substrates 20 and 30 having a substantially rectangular plate shape is bonded to each other such that the plate surfaces face each other. The two substrates 20 and 30 are bonded to each other by a seal material such as an epoxy resin with a predetermined spacing, and a liquid crystal material containing liquid crystal molecules whose alignment state is changed by a supply of an electrical signal is filled in a space formed between the two substrates 20 and 30 to form a liquid crystal layer 40. As the liquid crystal material, the well-known materials can be used.

The liquid crystal cell 11 is disposed such that the liquid crystal molecules are aligned approximately horizontally with respect to the plate surfaces of the two substrates 20 and 30 in an initial state (non-energized state) where no voltage is applied between the substrates 20 and 30. Examples of such a liquid crystal cell include those which are driven in an in-plane switching (IPS) mode or a fringe-field switching (FFS) mode in which the liquid crystal layer 40 is applied with a transverse electric field or an oblique electric field, and an optically compensated bend (OCB) mode or a twisted nematic (TN) mode in which the liquid crystal layer 40 is applied with a longitudinal electric field. FIG. 4 shows the liquid crystal cell 11, which is operated in the so-called IPS mode, as an example of the liquid crystal cell, but the application of the present technology is not limited thereto.

In the pair of substrates 20 and 30 shown in FIG. 4, the substrate disposed at the front surface side is a CF substrate (color filter substrate; sometimes referred to as a counter substrate, a common electrode substrate, or the like) 20, and the substrate disposed at the back surface side is a TFT substrate (thin film transistor substrate; sometimes referred to as a device substrate, an element substrate, an array substrate, a matrix substrate, or the like) 30. A display area (active area) which can display an image is formed at a central part of the plate surface of the liquid crystal panel 10, and pixels are formed inside the display area. An area surrounding the display area is a frame area, and no pixels are formed in the frame area which is a non-display area (non-active area) in which an image is not displayed. Although not shown in FIG. 1 and the like, terminals are formed in the frame area which is the non-display area, and a transmission part for supplying an electric signal from an external signal source or a drive part for displaying an image in the display area are connected or mounted.

As shown in FIG. 4, the two substrates 20 and 30 include insulating light transmitting substrates 21 and 31 which are substantially transparent and transmit visible light. Both the light transmitting substrates 21 and 31 constituting the liquid crystal panel 10 are a hard substrate that is not elastically deformed, and for example, a glass substrate is used. Instead of the glass substrate, a silicon substrate, a plastic substrate having heat resistance, or the like may be used. The light transmitting substrate 21 of the CF substrate 20 and the light transmitting substrate 31 of the TFT substrate 30 may be made of different materials. Note that as the light transmitting substrate constituting the liquid crystal panels 200 and 300, a flexible substrate made of a resin film or sheet having flexibility such as polyimide is used such that the liquid crystal panels 200 and 300 are bendable. Various films are stacked on inner surface sides (liquid crystal layer 40 side and opposite surface sides of the two substrates 20 and 30) of the two light transmitting substrates 21 and 31 in a predetermined pattern by the known film forming technology such as a photolithography method to form various structures.

For example, as shown in FIG. 4, a color filter 22, an overcoat film 23, a spacer 41, and a CF substrate side alignment film 28 are sequentially disposed on an inner surface side (liquid crystal layer 40 side) of the CF substrate 20 from a lower layer side (light transmitting substrate 21 side). The color filter 22 includes R (red), G (green), and B (blue) colored portions configured to selectively transmit R, G, and B color lights, and a black matrix BM disposed at boundaries between the respective colored portions. The black matrix BM is disposed at a position covering a non-pixel portion (that is, an area in which various metal wirings including a gate line and a source line 51 described below or elements such as TFT are formed) on the TFT substrate 30 in a state where the black matrix BM is bonded to the TFT substrate 30. The overcoat film 23 is made of, for example, an acrylic resin or the like, and is formed on the entire surface of an upper layer of the color filter 22 in a solid state. The spacer 41 can be formed by, for example, a photolithography method using an acrylic photosensitive resin or the like, and is preferably disposed at an appropriate position on the overcoat film 23 superimposed on the black matrix BM, for example, near an intersection of the gate line and the source line 51 on the TFT substrate 30 described below. The spacer 41 protrudes toward the TFT substrate 30 in the liquid crystal panel 10 by a predetermined length, and abuts on a TFT substrate side alignment film 38 described below via the CF substrate side alignment film 28. The spacer 41 has a flat part at a tip thereof and is preferably formed to abut on the TFT substrate side alignment film 38 in a region (surface) having a predetermined area. The CF substrate side alignment film 28 is a horizontal optical alignment film containing a polymer P1 like the TFT substrate side alignment film 38 described below, and is formed to cover the surfaces of the spacer 41 and the overcoat film 23 and to be in contact with the liquid crystal layer 40.

Note that FIG. 4 illustrates the liquid crystal cell 11 operated in the IPS mode, and therefore the CF substrate 20 is not provided with an electrode. In the liquid crystal cell operated in the OCB mode or the TN mode and applied with the longitudinal electric field, a solid-state counter electrode formed of a transparent electrode film is provided, for example, between the color filter and the overcoat on the CF substrate.

For example, a metal film made of a metal material selected from copper, titanium, aluminum, molybdenum, tungsten and the like, an insulating film made of silicon nitride ($SiN_x$), silicon oxide ($SiO_2$), or an insulating resin, a semiconductor film made of a silicon thin film, an oxide thin film or the like, and a transparent electrode film containing a transparent metal oxide such as indium tin oxide (ITO) and indium zinc oxide (IZO) are stacked on the inner surface side (liquid crystal layer 40 side) of the TFT substrate 30 in a predetermined pattern. By these films, a plurality of gate lines (gate bus lines, row wirings, row control lines, and scanning lines) and source lines 51 (source bus lines, column wirings, column control lines, and data lines) are disposed on the TFT substrate 30 in a grid shape, and a thin film transistor (TFT) serving as a switching element or an electrode is formed in each squared area inside the grid and arranged in a matrix shape. The TFT substrate side alignment film 38 is provided to cover innermost side surfaces of each structure. The TFT substrate side alignment film 38 is a horizontal optical alignment film containing the polymer P1 described below, and is formed in a solid state so as to be in contact with the liquid crystal layer 40.

Note that FIG. 4 exemplifies the liquid crystal cell 11 operated in the IPS mode, and in such a liquid crystal cell 11, a comb-like common electrode 53 and a pixel electrode 55 formed of a transparent electrode film are formed in the same layer of the TFT substrate 30 and teeth parts are disposed in a nested manner to be face each other. In the liquid crystal cell operated in the OCB mode or the TN mode and applied with the longitudinal electric field, the TFT substrate is not provided with the common electrode, and for example, only squared pixel electrodes are provided in each pixel as an electrode. In addition, in the liquid crystal cell operated in the FFS mode and applied with the oblique electric field, for example, a solid-state common electrode and a pixel electrode having a slit are provided in layers of different heights on the TFT substrate.

In the liquid crystal cell 11, as described above, the pixel electrode 55 provided on the TFT substrate 30 and the TFT connected to the pixel electrode 55 constitute a pixel, and colors corresponding to the R, G, and B colored portions of the color filter 22 opposite to the pixel electrode 55 constituting the pixel are considered to be exhibited. When a potential is supplied to each pixel electrode 55 according to an electrical signal output from an external signal supply source connected to the non-display area or a drive circuit formed in the frame area to the gate line or the source line 51, a potential difference is generated between the pixel electrode 55 and the common electrode 53 provided on the TFT substrate 30 (or between the pixel electrode of the TFT substrate and the counter electrode of the CF substrate). As a result, an electric field is applied to the liquid crystal layer 40 to change the alignment state of the liquid crystal molecules, and therefore, the amount of light transmitting the liquid crystal panel 10 is individually controlled for each pixel and a predetermined color image is displayed in the display area.

For example, in the liquid crystal cell 11 operated in the IPS mode shown in FIG. 4, a nematic liquid crystal material having positive dielectric anisotropy is used, and the liquid crystal layer 40 in the vicinity of the TFT substrate 30 is applied with an electric field in a horizontal direction (transverse electric field) based on the potential difference between the pixel electrode 55 and the common electrode 53. As a result, the liquid crystal molecules aligned substantially horizontally to the plate surfaces of the substrates 20 and 30 in the liquid crystal layer 40 in the non-energized state are switched in a plane such that the alignment state of the liquid crystal molecules is changed, so that the optical properties of the liquid crystal cell 11 are changed. In the liquid crystal cell operated in the FFS mode, the liquid crystal layer 40 is applied with an electric field in the oblique direction based on the potential difference between the pixel electrode 55 and the common electrode 53 provided on the TFT substrate, so that the alignment state of the liquid crystal molecules is changed. In the OCB mode or TN mode, the liquid crystal layer 40 is applied with an electric field in a vertical direction (longitudinal electric field) based on the potential difference between the pixel electrode of the TFT substrate and the counter electrode of the CF substrate, so that the alignment state of the liquid crystal molecules is changed.

In order to manufacture the liquid crystal panel 10 having the structure as described above, first, various structures described above are formed on a plate surface of one of the flat two light transmitting substrates 21 and 31, and the alignment films 28 and 38 are formed to cover the innermost side surfaces of each structure. After the alignment treatment of the alignment films 28 and 38 is performed, the two substrates 20 and 30 are bonded to each other such that the alignment film surfaces face each other The liquid crystal material is injected into the space between the two substrates 20 and 30 by, for example, a so-called vacuum injection method for bonding the pair of substrates 20 and 30 to each other and then performing a decompression to inject the liquid crystal material into the space between the two substrates 20 and 30, a so-called dropping injection method for dropping and filling the liquid crystal material onto and into one of the two substrates 20 and 30 when the two substrates 20 and 30 are bonded to each other, or the like. After the liquid crystal cell 11 having a flat shape as described above is manufactured, the two light transmitting substrates 21 and 31 are subjected to thinly polishing processing until the two light transmitting substrates 21 and 31 become a thickness dimension (for example, 0.2 mm or less) at which bending deformation can be made. Then, after the polarizing plates 29 and 39 are bonded to an outer surface of the thinned flat liquid crystal cell 11 and the control substrate and the like are mounted, for example, the liquid crystal panel 10 is deformed to be along a housing or the like formed to have a predetermined curved surface in advance. As a result, the liquid crystal panel 10 having a shape curved around the curved axis AX is manufactured.

FIG. 5 is a diagram schematically showing an appearance in which the two substrates 20 and 30 are deformed when the liquid crystal panel 10 is curved. In the liquid crystal panel 10, the spacer 41 formed on the CF substrate 20 abuts on the TFT substrate side alignment film 38 formed on the innermost surface of the TFT substrate 30 via the CF substrate side alignment film 28, so that the spacing between the CF substrate 20 and the TFT substrate 30 is maintained. As shown in FIG. 5, when the central part of the liquid crystal panel 10 in the X-axis direction is deformed so as to push the back surface side (TFT substrate 30 side), the two substrates 20 and 30 are displaced relative to each other, and the tip of the spacer 41 moves outward along the X axis while rubbing the TFT substrate side alignment film 38. That is, a frictional force F in the X-axis direction, that is, a vertical direction D1 perpendicular to the curved axis AX acts on the CF substrate side alignment film 28 covering the tip of the spacer 41 and the TFT substrate side alignment film 38 on which the CF substrate side alignment film 28 abuts. When a film hardness of the two alignment films 28 and 38 against such external force is not sufficient, the two alignment films 28 and 38 are scraped to generate scraps, which float in the liquid crystal layer 40 to be recognized as bright spots. Note that even in the liquid crystal cells of the liquid crystal panels 200 and 300, the same events as described above are observed when the liquid crystal panels are curved. The liquid crystal panels formed to be bendable like the liquid crystal panels 200 and 300 are repeatedly deformed not only at the time of manufacturing but also during use, so that the respective substrates are relatively displaced and the frictional force F acts on the alignment film. Therefore, the possibility that the scraps are generated to cause the bright spots is high.

Here, the two alignment films 28 and 38 are a horizontal alignment film which allows the liquid crystal molecules in the liquid crystal layer 40 to be aligned substantially parallel to the alignment film, and include the polymer P1 having an alkylene chain structure consisting of an alkylene group represented by $-(CH_2)_n-$ and having two or more carbon atoms in a main chain. As described above, the polymer P1 has an alkylene chain structure having two or more carbon atoms in the main chain, so that the liquid crystal alignment characteristics of the alignment films 28 and 38 can be improved. The polymer P1 can be, for example, at least one polymer selected from the group consisting of polyamic acid, polyamic acid ester, and polyimide. The alkylene chain structure in the main chain of the polymer is preferably a straight chain form from the viewpoint of exhibiting excellent alignment characteristics and high anisotropy in the alignment film. In order to control a tilt angle of the liquid crystal material in accordance with the operation mode of the liquid crystal panel, a side chain structure which applies a tilt may be introduced into a part of a chemical structure of a polymer forming the alignment film or a vertical polymer may be mixed in the polymer forming the alignment film for use.

The polymer P1 preferably further has a photofunctional group. The photofunctional group can be, for example, at least one selected from the group consisting of cyclobutane, azobenzene, chalcone, cinnamate, coumarin, and stilbene.

The two alignment films 28 and 38 can be, for example, a horizontal optical alignment film which includes the polymer P1 represented by the following Formula (1) and is subjected to the optical alignment treatment by polarized irradiation. Such an optical alignment film exhibits a function of aligning the liquid crystal molecules such that the polymer P1 is aligned in the film by the optical alignment treatment and the predetermined angle is maintained with respect to the polarization direction.

[Formula 1]

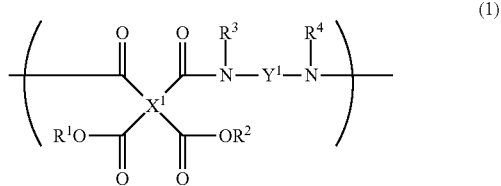

(1)

In the above Formula (1), $R^1$, $R^2$, $R^3$, and $R^4$ each represent a hydrogen atom or a hydrocarbon group, $X^1$ is a tetravalent organic group, $Y^1$ is a divalent organic group, one of $X^1$ and $Y^1$ has at least one photofunctional group selected from the group consisting of cyclobutane, azobenzene, chalcone, cinnamate, coumarin, and stilbene, and the other of $X^1$ and $Y^1$ has an alkylene chain structure having two or more carbon atoms. $R^1$, $R^2$, $R^3$, and $R^4$ each are preferably independently a hydrogen atom or a hydrocarbon group having 1 to 3 carbon atoms, and particularly preferably a hydrogen atom, a methyl group, or an ethyl group.

The two alignment films 28 and 38 preferably contain a polymer having an alkylene chain or alkyl chain structure in a molecule. For example, the polymer P1 may be one having an alkylene chain structure at $X^1$ and having azobenzene at $Y^1$, or one having cyclobutane at $X^1$ and having an alkylene chain structure at $Y^1$ in the above Formula (1). The alignment film containing the polymer having the alkylene chain or alkyl chain structure in the molecule is subjected to heating treatment, so that self-organization in which an alignment order is improved occurs. By using such an alignment film, a liquid crystal display device excellent in alignment characteristics such as contrast can be realized. It can be determined, for example, by measuring the retardation of the alignment film whether the film has the enhanced alignment order by using the self-organization by the alkylene chain structure or the alkyl chain structure. The retardation of the conventional alignment film which is not self-organized is approximately less than 1 nm. It is preferable to use, as the alignment films 28 and 38, a self-organization type horizontal alignment film in which the alignment order in the horizontal direction is particularly improved, and the retardation of the alignment film exhibits 1 nm or more in the alignment direction of the polymer.

In order to form the alignment films 28 and 38, first, a liquid crystal alignment treatment agent containing the polymer P1 as described above is prepared. The liquid crystal alignment treatment agent is one which is given fluidity by dissolving the polymer (resin component, solid content) forming the alignment film in an organic solvent or the like, and may contain components such as a solvent or a compound for improving film thickness uniformity and surface smoothness of a coated film, a compound for improving an adhesion between the alignment film and the substrate, and the like, in addition to the organic solvent. In addition, the liquid crystal alignment treatment agent may contain a crosslinking agent for promoting crosslinking of a polymer to increase film hardness. Examples of the resin component may contain a polymer consisting of polyimide, other polymers, or the like, in addition to the above-described polymer P1.

The organic solvent used for the liquid crystal alignment treatment agent is not particularly limited as long as it is an organic solvent which can dissolve the resin component. For example, N-methyl-2-pyrrolidone (NMP), γ-butyrolactone (γ-BL), γ-butyrolactam, N,N-dimethylformamide, N,N-dimethylacetamide, 4-hydroxy-4-methyl-2-pentanone, ethylene glycol monomethyl ether, butyl lactate, butyl acetate, methyl methoxy propionate, ethyl ethoxy propionate, ethylene glycol methyl ether, ethylene glycol ethyl ether, ethylene glycol n-propyl ether, ethylene glycol-i-propyl ether, ethylene glycol-n-butyl ether (butyl cellosolve, BC), ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, dipropylene glycol monomethyl ether, diisobutyl ketone (DIBK), isoamyl propionate, isoamyl isobutyrate, diisopentyl ether, ethylene carbonate, propylene carbonate, and the like may be used alone or a mixture thereof can be used. The content of the resin component in the liquid crystal alignment treatment agent can be, for example, 1 to 20% by mass, preferably 2 to 15% by mass, and more preferably 3 to 10% by mass.

In order to form a horizontal optical alignment film containing the polymer P1 represented by the above Formula (1) as the alignment films 28 and 38, the liquid crystal alignment treatment agent containing the polymer P1 is applied to the innermost layer side (liquid crystal layer 40 side) of the two substrates 20 and 30. The method for applying a liquid crystal alignment treatment agent is not particularly limited, and may be performed using a coating machine such as a dip, a roll coater, a slit coater, a spinner, and the like in addition to screen printing, offset printing, flexo printing, and ink jet.

Subsequently, the applied material applied onto the two substrates 20 and 30 is temporarily fired and subjected to the optical alignment treatment, and then is subjected to the main firing to manufacture the liquid crystal cell 11 in which the liquid crystal layer 40 is disposed, and is subjected to re-alignment treatment if necessary. In the temporary firing, the applied material is subjected to heat treatment to remove the organic solvent and the like from the liquid crystal alignment treatment agent, thereby forming a resin film. In the optical alignment treatment, the polymer P1 having the photofunctional group in the resin film is aligned and arranged in a predetermined direction by irradiating with a predetermined linearly polarized light. In the main firing, the resin film is subjected to heat treatment again to form an optical alignment film having alignment characteristics for aligning liquid crystal molecules in a predetermined direction. The alignment property of the liquid crystal cell 11 can be further improved by performing the re-alignment treatment on liquid crystal molecules after the liquid crystal cell 11 is manufactured. The above-described temporary firing and main firing are performed by heating to 50 to 300° C. and preferably 80 to 250° C., so that a part of the polyamic acid is appropriately imidized.

In the present technology, the polymer P1 which is included in the alignment film and has an alkylene chain structure having two or more carbon atoms in a main chain is aligned such that the alkylene chain structure extends perpendicularly to the direction in which an external force acts on the alignment film. As described above, when the liquid crystal panel 10 is curved around the curved axis AX parallel to the Y axis, since the frictional force F in the X-axis direction (vertical direction D1) acts on the two alignment films 28 and 38, in order to reduce the scraping of the alignment film when the liquid crystal panel 10 is curved, the polymer P1 is aligned such that the alkylene chain structure extends parallel to the Y axis (curved axis AX) perpendicular to the X-axis direction. Such a configuration can be realized by irradiating with the predetermined linearly polarized light, specifically, polarized ultraviolet light polarized in the X-axis direction (vertical direction D1) to the resin film constituting the two alignment films 28 and 38 when performing the optical alignment treatment.

As described above, for example, the liquid crystal panel 10 includes the pair of substrates 20 and 30 disposed opposite to each other in the state where the plate surfaces are spaced apart from each other, the liquid crystal layer 40 disposed between the pair of substrates 20 and 30, the spacer 41 provided on the opposite surface of the CF substrate (at least one substrate) 20 of the pair of substrates 20 and 30, and the TFT substrate side alignment film (alignment film) 38 provided on the opposite surface of the TFT substrate (at least the other substrate) 30 of the pair of substrates 20 and 30, in which the display surface 10DS displaying an image is the liquid crystal panel curved around the curved axis AX, the spacer 41 indirectly abuts on the TFT substrate side alignment film 38 provided on the opposite surface of the TFT substrate 30 via the CF substrate side alignment film 28, the TFT substrate side alignment film 38 is the horizontal alignment film which contains the polymer P1 having the alkylene chain structure having two or more carbon atoms in the main chain and allows the liquid crystal molecules in the liquid crystal layer 40 to be aligned horizontally to the TFT substrate side alignment film 38, and in the TFT substrate side alignment film 38 provided on the opposite surface of the TFT substrate 30, the polymer P1 is aligned such that the alkylene chain structure extends parallel to the curved axis AX. In the above description, the spacer 41 may be configured to directly abut on the TFT substrate side alignment film 38. In addition, the TFT substrate side alignment film 38 may be one which allows the liquid crystal molecules in the liquid crystal layer 40 to be aligned substantially horizontally to the TFT substrate side alignment film 38.

The alignment film containing the polymer having the alkylene chain structure in the main chain is in the state where the main chain of the polymer is aligned and arranged in one direction when the alignment treatment is performed. As a result of intensive studies, the present inventors have found that such an alignment film exhibits excellent alignment characteristics due to a uniaxial alignment order of the main chain of the polymer, whereas anisotropy appears in film hardness in order that the alkylene chain structure is also aligned in one direction. Specifically, the present inventors has found that such an alignment film is weak against an external force acting along the alignment direction (that is, the extending direction of the alkylene chain structure) of the main chain of the polymer, but is very strong against an external force perpendicularly acting on the alignment direction of the polymer, and completed the present technology.

In the liquid crystal panel 10 having the above configuration, when changing from the flat shape to the curved shape, the spacer 41 protruding from the CF substrate 20 rubs the TFT substrate side alignment film 38 provided on the opposite surface of the TFT substrate 30 along the vertical direction D1 perpendicular to the curved axis AX. In addition, according to the above configuration, in the TFT substrate side alignment film 38, the polymer P1 is aligned such that the alkyl chain structure extends in a direction parallel to the curved axis AX of the liquid crystal panel 10. Therefore, when the liquid crystal panel 10 is curved, the frictional force F acting on the TFT substrate side alignment film 38 perpendicularly acts on the alignment direction (the extending direction of the alkyl chain structure) of the polymer P1. As clarified from the above findings, the alignment film containing the polymer P1 is extremely strong against such an external force (external force perpendicularly acting on the alignment direction of the polymer P1), so that when the liquid crystal panel 10 is curved, the TFT substrate side alignment film 38 becomes difficult to be scraped and the occurrence of scraps is reduced. As a result, it is possible to suppress the occurrence of the bright spots caused by the scraps which float the liquid crystal layer 40. In the above configuration, the alkylene chain structure in the main chain of the polymer P1 is preferably a straight chain form which does not have a branch, from the viewpoint of exhibiting the excellent alignment characteristics and the high anisotropy in the alignment film. In addition, in the configuration in which the tip of the spacer 41 abuts on the TFT substrate side alignment film 38 via the CF substrate side alignment film 28, from the viewpoint of suppressing the scraping of the CF substrate side alignment film 28, it is preferable that the CF substrate side alignment film 28 has the same configuration as the TFT substrate side alignment film 38. The spacer 41 may be formed on the TFT substrate 30. In this case, it is preferable that at least the CF substrate side alignment film 28 includes, for example, the polymer P1, and has a configuration in which the polymer P1 is aligned parallel to the curved axis AX of the liquid crystal panel 10. The CF substrate side alignment film 28 may have a configuration in which the spacer 41 is provided on both the CF substrate 20 and the TFT substrate 30. In this case, the CF substrate side alignment film 28 may have a configuration in which the polymer contained in the alignment film disposed at the abutment position of the spacer 41 may be aligned parallel to the curved axis AX of the liquid crystal panel 10. Further, the virtual curved axis AX need not to be disposed on the substrate side on which the spacer is formed relative to the liquid crystal panel 10, but may be disposed on the substrate side opposite to the substrate on which the spacer is formed. For example, in the above embodiment in which the spacer 41 is formed on the CF substrate 20, it is possible to obtain the effect of suppressing the scraping of the film as described above even in the case where the liquid crystal panel 10 is formed in a substantially arc shape in which both side portions in the long side direction (X-axis direction) in the display surface 10DS are retracted to the back surface side and the center portion in the long side direction protrudes to the front surface side.

In addition to the IPS mode, the liquid crystal panel 10 can be configured to be driven in the FFS mode, the OCB mode, or the TN mode. One particularly strongly rubbed by the spacer 41 when the liquid crystal panel 10 is curved is the TFT substrate side alignment film 38 provided on the opposite surface of the TFT substrate 30 on which the spacer 41 abuts, and the alignment direction (extending direction of the alkylene chain structure) of the polymer P1 on the TFT substrate side alignment film 38 may be parallel to the curved axis AX of the liquid crystal panel 10. Therefore, as described in the above configuration, the present technology can be applied to all liquid crystal panels in the horizontal alignment display mode in which the liquid crystal molecules are aligned substantially parallel to the alignment film in the initial state (non-energized state).

In addition, in the liquid crystal panel 10, the TFT substrate side alignment film 38 is preferably the horizontal optical alignment film having at least one photofunctional group selected from the group consisting of cyclobutane, azobenzene, chalcone, cinnamate, coumarin, and stilbene. Since the horizontal optical alignment film has low film hardness compared to the conventional rubbing alignment film and the bright spot is particularly easily generated, the present technology is particularly useful in the liquid crystal panel provided with such a horizontal optical alignment film. Among them, in the horizontal optical alignment film containing the polymer P1 having the alkylene chain structure introduced into the main chain and having the photofunctional group described in the above configuration, since the film hardness anisotropy exhibited by the alignment is large, the effect of suppressing the film scraping may be obtained by appropriately arranging the polymer P1.

In addition, in the liquid crystal panel 10, the above-described TFT substrate side alignment film 38 may be subjected to the optical alignment treatment by irradiating with the polarized ultraviolet light polarized in the vertical direction D1 perpendicular to the curved axis AX. In this way, the main chain of the polymer P1 contained in the TFT substrate side alignment film 38 and furthermore the alkylene chain structure can be aligned parallel to the curved axis AX.

In addition, in the liquid crystal panel 10, the retardation of the TFT substrate side alignment film 38 is preferably 1 nm or more. In the alignment film having such retardation, it is determined that the polymer having the alkylene chain structure is self-organized in the main chain by heating and the alignment order is improved. When such self-organization occurs, the alignment characteristics of the alignment film are further improved, and the liquid crystal display device having excellent contrast characteristics can be realized.

In addition, in the liquid crystal panel 10, the spacer 41 preferably surface-abuts on the TFT substrate side alignment film 38 provided on the opposite surface of the TFT substrate 30. The spacer 41 has a flat part formed at the tip thereof, and the spacer 41 can be formed to abut on the TFT substrate side alignment film 38 (via the CF substrate side alignment film 28) on a surface having a predetermined area. By doing so, for example, the frictional force F due to the relative displacement of the spacer 41 is dispersed and received over a wide area of the TFT substrate side alignment film 38 as compared with a structure in which the tip of the spacer point-abuts on the alignment film while maintaining a hemispherical shape. As a result, the TFT substrate side alignment film 38 is less likely to be scraped, and the occurrence of scraps is reduced. Note that the spacer can be formed in various shapes as long as the spacer has the flat part formed at the tip thereof and the spacer surface-abuts on the alignment film. For example, the spacer can be formed in a cylindrical shape or a prismatic shape. In addition, the spacer may be formed in a substantially conical shape or a pyramid shape, a hemispherical shape or the like, and the flat part may be formed at the tip of the spacer by pressing the tip of the spacer by the substrate at the time of bonding the substrates.

In addition, the present technology can be applied to the liquid crystal panels 200 and 300 including the pair of substrates formed of the flexible substrate. According to the configuration in which the pair of substrates is the flexible substrate, it is possible to manufacture the liquid crystal panels 200 and 300 bendable and deformable during use. In such liquid crystal panels 200 and 300, even after manufacturing, bending stress may be applied and the alignment film may be rubbed by the spacers, such that the film hardness required for the alignment film in the rubbing direction is further increased. The present technology is also very useful for such the curved or deformable liquid crystal panel 200 and 300.

EXAMPLES

Hereinafter, the present technology will be described in more detail with reference to Examples. Note that the present technology is not limited at all by these Examples.

Example 1

In the above Formula (1), a polymer P1-1 consisting of a polyamic acid in which $X^1$ has a cyclobutane ring as a photofunctional group and $Y^1$ has an alkylene chain structure having two carbon atoms was used, and an organic solvent or the like was combined such that a resin component (solid content) containing a polymer P1-1/N-methyl-2-pyrrolidone (NMP)/γ-butyrolactone (γ-BL)/butyl cellosolve (BC)/diisobutyl ketone (DIBK)=4/50/20/18/8 as a mass ratio, thereby preparing a liquid crystal alignment treatment agent AA-1.

Figure 6A:
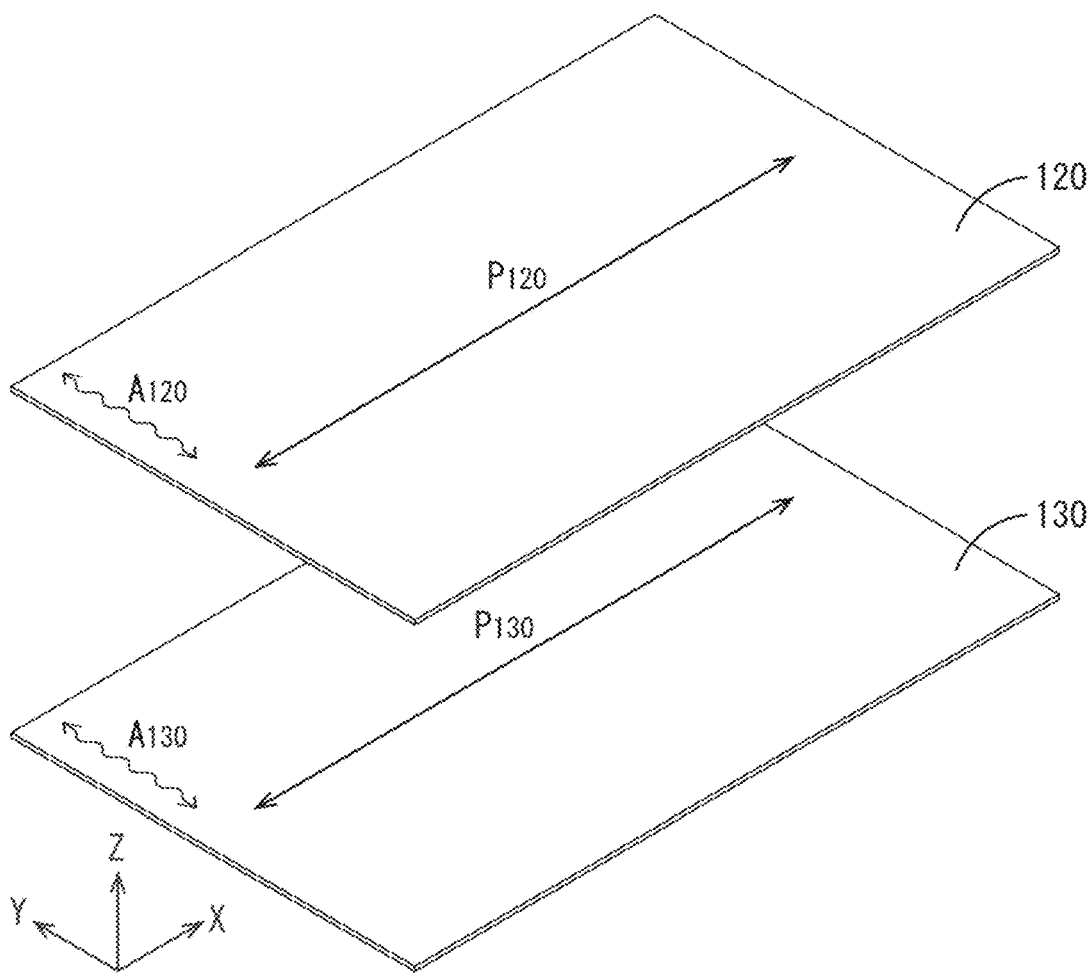
FIG. 6A is a schematic diagram for explaining optical alignment treatment on a CF substrate and a TFT substrate in Example 1.

A TFT substrate 130 having an IPS electrode structure and a CF substrate 120 having a substantially conical spacer 141 (see FIG. 9A) having a flat part formed at a tip thereof were prepared, and the liquid crystal alignment treatment agent AA-1 prepared as described above was applied to the opposite surfaces of the two substrates 120 and 130 by the ink jet coating method. The two substrates 120 and 130 coated with the liquid crystal alignment treatment agent AA-1 were temporarily dried at 70° C., and then heated at 230° C. for 30 minutes to perform the temporary firing, thereby forming the resin film. Subsequently, the film surface of the resin film was irradiated with the linearly polarized ultraviolet light of 2 J/cm² at 254 nm from a normal direction of each substrate to perform the optical alignment treatment. In FIG. 6A, the polarization direction of the polarized ultraviolet light with which the CF substrate 120 and the TFT substrate 130 are irradiated are indicated by $P_{120}$ and $P_{130}$. Note that the degree of polarization of the polarized ultraviolet light irradiated was 30:1 at a wavelength of 254 nm. Thereafter, the two substrates 120 and 130 were again heated at 230° C. for 30 minutes to perform the main firing. The film thickness of the two alignment films obtained after the firing was about 100 nm. The alignment film containing the polymer P1-1 formed in Example 1 has cyclobutane which is subjected to a photoisomerization reaction, and can be referred to as a photolytic alignment film.

Figure 6B:
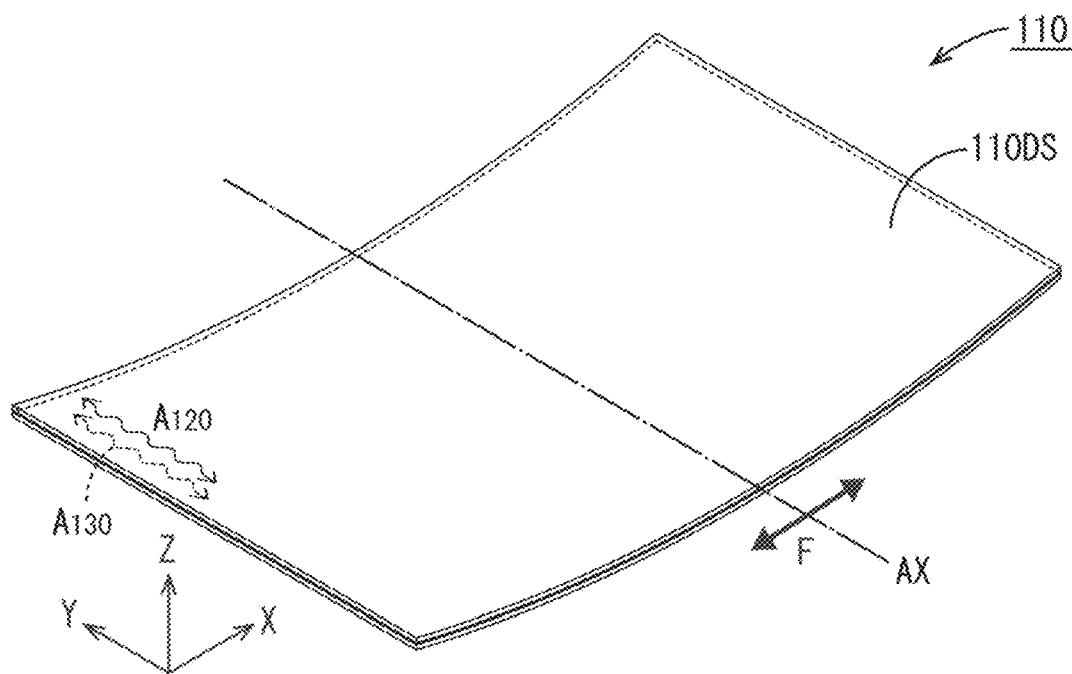
FIG. 6B is a schematic diagram for explaining an appearance in which the CF substrate and the TFT substrate subjected to the optical alignment treatment are bonded to each other and curved.

Subsequently, WORLD ROCK (registered trademark) manufactured by Kyoritsu Chemical & Co., Ltd., which is a combined heat and visible light sealing material was drawn on the TFT substrate 130 by a dispenser, and as shown in FIG. 6B, the liquid crystal layer was sandwiched and bonded to the CF substrate 120 such that the polarization directions $P_{120}$ and $P_{130}$ of the irradiated light are parallel to each other, thereby manufacturing the liquid crystal cell. Note that as the liquid crystal material, the positive type liquid crystal having positive dielectric anisotropy was used. Thereafter, the liquid crystal cell is heated at 130° C. for 40 minutes to perform the re-alignment treatment of the liquid crystal molecules, thereby obtaining the flat liquid crystal cell in which the liquid crystal molecules in the liquid crystal layer are uniformly uniaxially aligned. In the liquid crystal cell thus obtained, the light transmitting substrates of the two substrates 120 and 130 were polished to make the thickness of each light transmitting substrate 0.2 mm. Subsequently, a polarizing plate on the TFT substrate 130 side is bonded such that the transmission axis is parallel to the X axis (vertical direction D1), and the polarizing plate on the CF substrate 120 side is bonded such that the transmission axis is parallel to the Y axis (curved axis AX), and thus the back light, the control substrate, and the like are mounted, thereby obtaining the liquid crystal panel 110. Finally, the liquid crystal panel formed into the flat shape is attached to the curved cover glass and incorporated into the housing, thereby obtaining the liquid crystal display device according to Example 1 having the shape in which the display surface 110DS is curved about the curved axis AX parallel to the Y axis.

When the optical alignment treatment is performed by irradiation with the linearly polarized ultraviolet light, the polymer P1-1 in the two alignment films is aligned such that the alkylene chain structure contained in the main chain extends perpendicularly to the polarization direction. As in the first embodiment, when the two substrates 120 and 130 are irradiated with the linearly polarized ultraviolet light in the X-axis direction, that is, in the directions (P120 and P130) perpendicular to the curved axis AX, the polymer P1-1 is aligned such that the alkylene chain structure included in the main chain extends parallel to the Y-axis direction, that is, the curved axis AX. In FIGS. 6A and 6B, the alignment direction (that is, the extending direction of the alkylene chain structure) of the polymer P1-1 in the CF substrate side alignment film and the TFT substrate side alignment film are indicated by $A_{120}$ and $A_{130}$. In the liquid crystal panel 110 according to Example 1, as shown in FIG. 6B, the alignment directions $A_{120}$ and $A_{130}$ of the polymers P1-1 in the two alignment films are perpendicular to the acting directions (X-axis direction and vertical direction D1) of the frictional force F acting when the liquid crystal panel 110 is curved. In the liquid crystal panel 110 according to Example 1, the irradiation polarization directions $P_{120}$ and $P_{130}$ when the two alignment films are subjected to the optical alignment treatment and the transmission axis direction of the polarizing plate on the TFT substrate 130 side are parallel to the X axis (vertical direction D1). In addition, the alignment directions (extending directions of the alkylene chain structure) $A_{120}$ and $A_{130}$ of the polymers P1-1 in the two alignment films, the alignment direction of the liquid crystal molecule in the liquid crystal layer, and the transmission axis direction of the polarizing plate on the CF substrate 120 side are parallel to the Y axis (curved axis AX).

Comparative Example 1

Figure 7A:
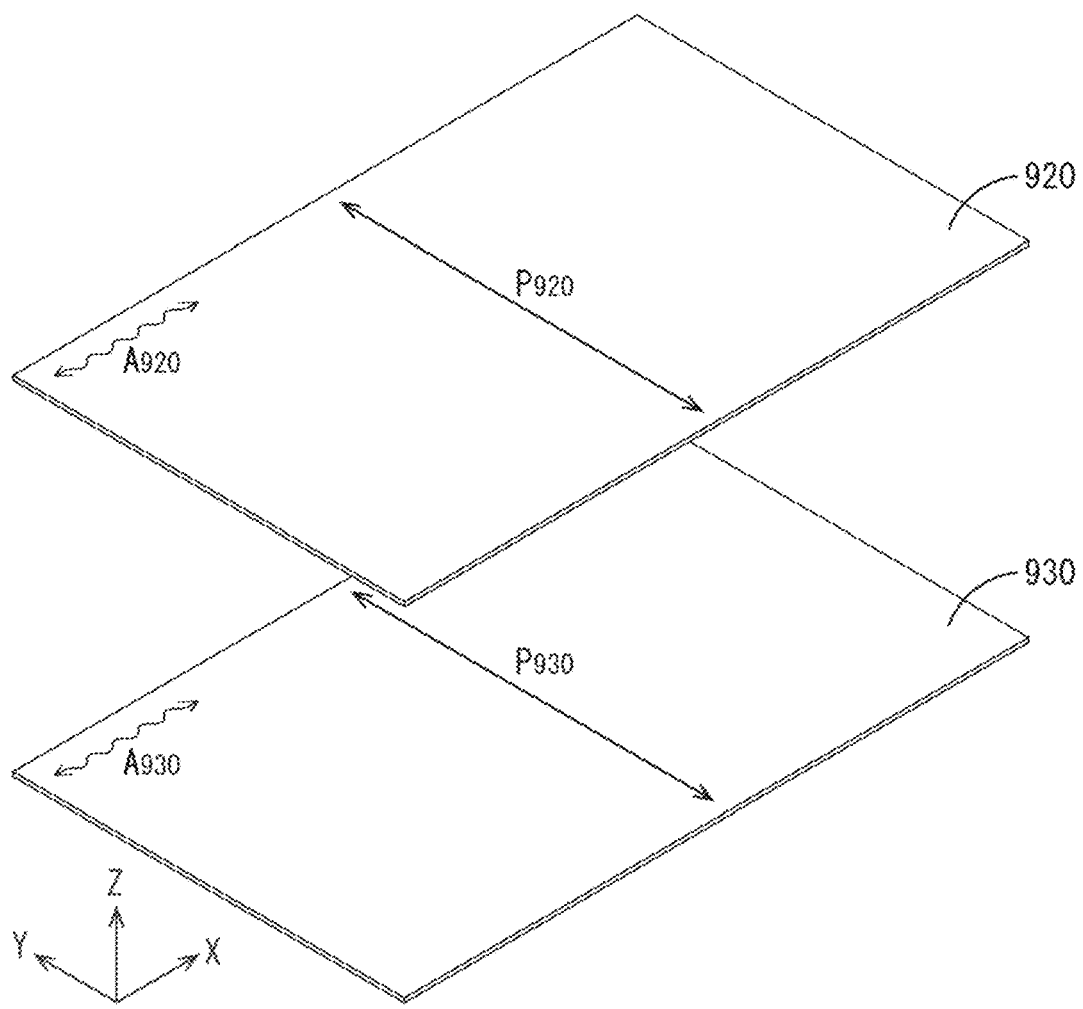
FIG. 7A is a schematic diagram for explaining optical alignment treatment on a CF substrate and a TFT substrate in Comparative Example 1.
Figure 7B:
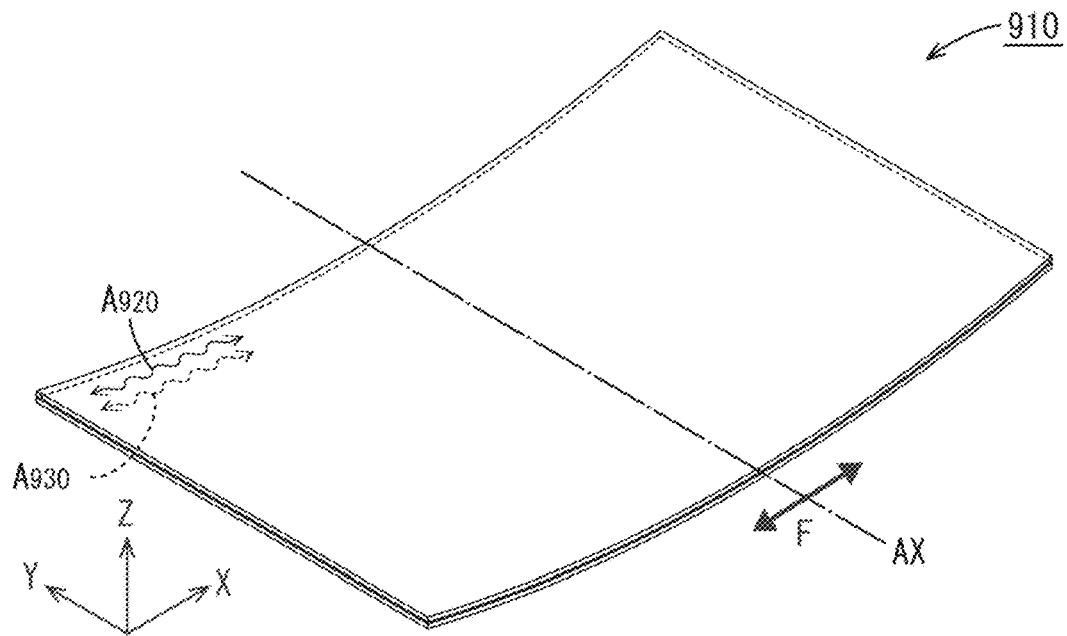
FIG. 7B is a schematic diagram for explaining an appearance in which the CF substrate and the TFT substrate subjected to the optical alignment treatment are bonded to each other and curved.

A liquid crystal display device according to Comparative Example 1 including a liquid crystal panel 910 was manufactured in the same manner as in Example 1 except that the polarization direction of the linearly polarized ultraviolet light to be irradiated when the optical alignment treatment is performed and the transmission axis direction of the polarizing plate attached to the liquid crystal cell are changed. Specifically, as shown in FIG. 7A, polarization directions $P_{920}$ and $P_{930}$ of the linearly polarized ultraviolet light irradiated when two alignment films formed on a CF substrate 920 and a TFT substrate 930 are subjected to optical alignment treatment is parallel to a Y axis (curved axis AX), a transmission axis of a polarizing plate on the TFT substrate 930 side is parallel to the Y axis (curved axis AX), and a transmission axis of a polarizing plate on the CF substrate 920 side is bonded to be parallel to an X axis (vertical direction D1). As a result, in the liquid crystal panel 910 according to Comparative Example 1, as shown in FIG. 7B, the alignment directions (extending directions of the alkylene chain structure) $A_{920}$ and $A_{930}$ of the polymers P1-1 in the two alignment films formed on the two substrates 920 and 930 are the same as the acting direction (X-axis direction and vertical direction D1) of the frictional force F acting when the liquid crystal panel 910 is curved. In the liquid crystal panel 910 according to Comparative Example 1, in addition to the alignment directions (extending directions of the alkylene chain structure) $A_{920}$ and $A_{930}$ of the polymers P1-1 in the two alignment films, the alignment direction of the liquid crystal molecules in the liquid crystal layer and the transmission axis direction of the polarizing plate on the CF substrate 920 side are parallel to the X axis (vertical direction D1). In addition, the irradiation polarization directions $P_{920}$ and $P_{930}$ when the two alignment film is subjected to the optical alignment treatment and the transmission axis direction of the polarizing plate on the TFT substrate 930 side are parallel to the Y axis (curved axis AX).

Example 2

A liquid crystal display device according to Example 2 was manufactured in the same manner as Example 1 except that a liquid crystal alignment treatment agent AA-2 was prepared by using a polymer P1-2 consisting of a polyamic acid in which $X^1$ has an alkylene chain structure having 4 carbon atoms and $Y^1$ has azobenzene as a photofunctional group in the above Formula (1), instead of the polymer P1-1 and an alignment film was formed using the prepared liquid crystal alignment treatment agent AA-2. The alignment film containing the polymer P1-2 formed in Example 2 has azobenzene which is subjected to a photoisomerization reaction, and can be referred to as a photolytic alignment film.

(Evaluation Method 1: Pencil Hardness Test)

A pencil hardness test was performed on the alignment film containing the polymer P1-1 formed in Example 1 and Comparative Example 1 in accordance with JIS K5600-5-4. Specifically, a test was performed with a pencil having a hardness of 3 H, a speed of 30 mm/min, and a load of 750 g using TriboGear TYPE 14 made by Shinto Scientific Co., Ltd. The rubbing direction was the same as the direction in which the frictional force F acts on the liquid crystal panel.

(Evaluation Method 2: Evaluation on Occurrence of Bright Spot)

With respect to the liquid crystal display devices manufactured in Examples 1 and 2 and Comparative Example 1, the occurrence of the bright spot defect was visually observed.

(Pencil Hardness Test Results in Example 1 and Comparative Example 1)

Figure 8A:
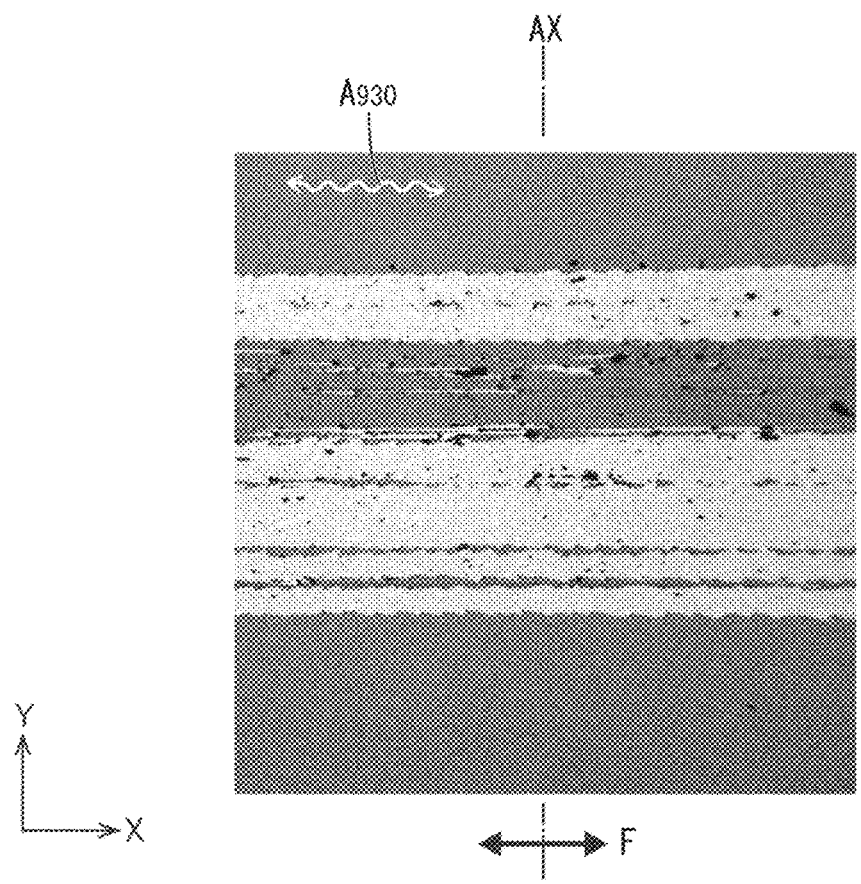
FIG. 8A is a diagram showing a state after a pencil hardness test is performed on the alignment film according to Comparative Example 1.
Figure 8B:
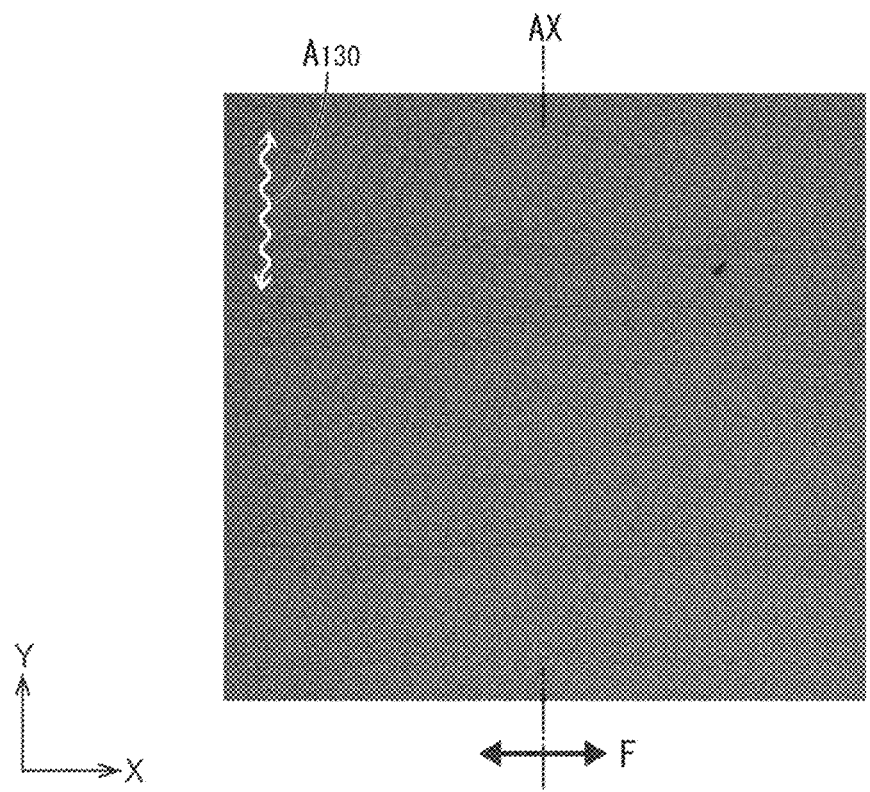
FIG. 8B is a diagram showing a state after a pencil hardness test is performed on the alignment film according to Example 1.

FIG. 8A shows an appearance of the alignment film according to Comparative Example 1 after the pencil hardness test, and FIG. 8B shows an appearance of the alignment film according to Example 1 after the pencil hardness test is performed. As shown in each drawing, the alignment direction $A_{930}$ of the polymer P1-1 in the alignment film according to Comparative Example 1 is the same as the direction in which the frictional force F acts, and the alignment direction $A_{130}$ of the polymer P1-1 in the alignment film according to Example 1 is perpendicular to the direction in which the frictional force F acts. When the horizontal optical alignment film containing the polymer P1-1 is applied with the frictional force F in the same direction (parallel) as the alignment direction of the polymer P1-1 (that is, the extending direction of the alkylene chain structure contained in the main chain), it may be understand from FIG. 8A that the horizontal optical alignment film is easily scraped. On the other hand, it is understood from FIG. 8B that the horizontal optical alignment film containing the polymer P1-1 is not easily scraped by the frictional force F applied perpendicularly to the alignment direction of the polymer P1-1. Due to such characteristics, in the curved or bendable liquid crystal panel, by aligning the polymer P1-1 in parallel to the curved axis AX as in Example 1, when the liquid crystal panel is curved, it was observed that the liquid crystal display device in which the film peeling hardly occurs even if the surface of the alignment film is rubbed by the spacer formed on the liquid crystal panel and the occurrence of the bright spots is suppressed can be provided.

(Results of Evaluation on Occurrence of Bright Spot in Example 1 and Example 2 and Comparative Example 1)

In the evaluation on the occurrence of the bright spots, the bright spots were not visually recognized in the liquid crystal display devices according to Example 1 and Example 2, but the bright spot defects were observed in the liquid crystal display device according to Comparative Example 1 during black display. As a result, in the liquid crystal panel 110 in which the polymer P1-1 is aligned parallel to the curved axis AX in the alignment film, it was confirmed that the liquid crystal display device in which the film peeling hardly occurs even when the liquid crystal panel 110 is curved, and the occurrence of the bright spots is suppressed can be provided. In particular, as in Example 1 and Example 2, in the alignment film containing the polymer having the alkylene chain structure, the self-organization occurs in which the alignment order is improved by the main firing. As a result, it is possible to realize a liquid crystal display device having particularly excellent alignment characteristics.

Example 3 and Example 4

Figure 9A:
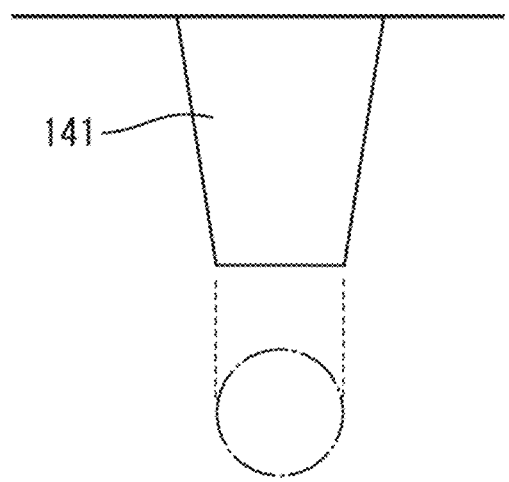
FIG. 9A is a schematic diagram showing a shape of a spacer according to Example 1.
Figure 9B:
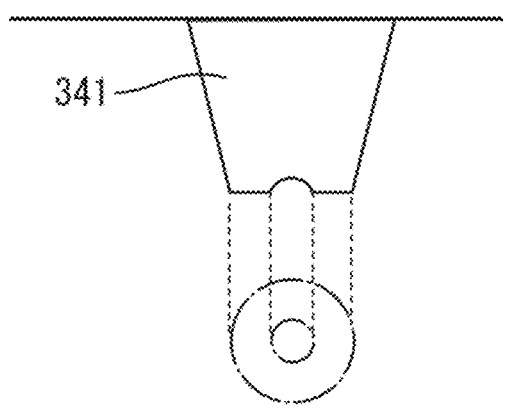
FIG. 9B is a schematic diagram showing a shape of a spacer according to Example 3.
Figure 9C:
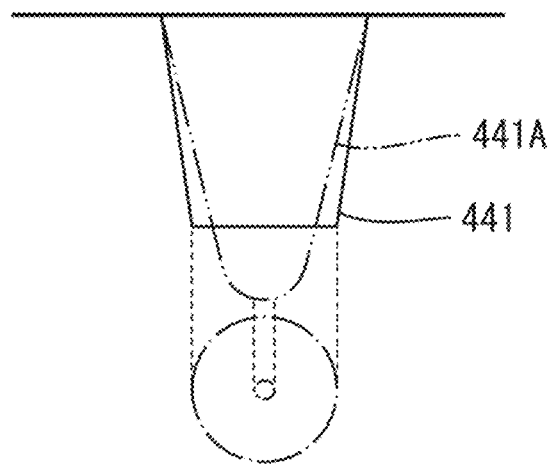
FIG. 9C is a schematic diagram showing a shape of a spacer according to Example 4.

A liquid crystal display device according to Example 3 and Example 4 was manufactured in the same manner as Example 1 except that the shape of the spacer 141 formed on the CF substrate 120 was changed. Specifically, as shown in FIG. 9A, the spacer 141 according to Example 1 had a substantially conical shape having the flat part formed at the tip thereof, protruded by a predetermined length from the CF substrate toward the TFT substrate, and had a shape in which the spacer 141 surface-abuts on the TFT substrate side alignment film in a circular area having a predetermined area. On the other hand, as shown in FIG. 9B, a spacer 341 according to Example 3 had a shape having a recess at the tip thereof. Further, in Example 4, as shown in FIG. 9C, first, a spacer 441A (shown by a two-dot chain line in FIG. 9C) having a hemispherical shape in which a conical tip of the spacer 441A is smoothed was formed, pressure was applied at the time of bonding the substrates to crush the tip of the spacer 441A, and the spacer 441 (shown by a solid line in FIG. 9C) having the flat part formed at the tip thereof was formed.

(Results of Evaluation on Occurrence of Bright Spot in Example 3 and Example 4)

In the liquid crystal display devices according to Example 3 and Example 4, the occurrence of the bright spots was evaluated by visual inspection in the same manner as in Example 1 and the like, but the bright spot defects were not observed. As in Example 1 or Example 3 and Example 4, in the configuration in which the flat part exists at the tip part of the spacer and the spacer abuts on the alignment film in the region having a predetermined area or more, the frictional force that the spacers 141, 341, and 441 apply to the alignment film is dispersed according to the abutment area. When a spacer 441A having a hemispherical shape in which the tip shown by a two-dot chain line in FIG. 9C is smoothed is formed to maintain the shape even after the substrates are bonded to each other, such a spacer 441A point-abuts on the alignment film on the TFT substrate side at a vertex of the center of the tip part. In this case, the frictional force that the spacer 441A applies to the alignment film is intensively applied to a very narrow area of the alignment film, so that the film scraping tends to occur. As compared with such a configuration, in the liquid crystal panels according to Example 1, Example 3, and Example 4, since the frictional force by the spacers 141, 341, and 441 is not applied to one point of the alignment film, so that the liquid crystal display device in which the scraps hardly occur and the occurrence of the bright spots is suppressed can be provided. Note that according to the present technology, the film hardness of the alignment film is improved in the direction in which the frictional force F acts and the film scraping hardly occurs, so that the occurrence of the bright spots can be further suppressed than the conventional liquid crystal display device including the curved liquid crystal panel or the bendable liquid crystal panel even when the spacer is shaped like the spacer 441A that abuts on the TFT substrate side alignment film in a narrow area.

Example 5

Figure 10A:
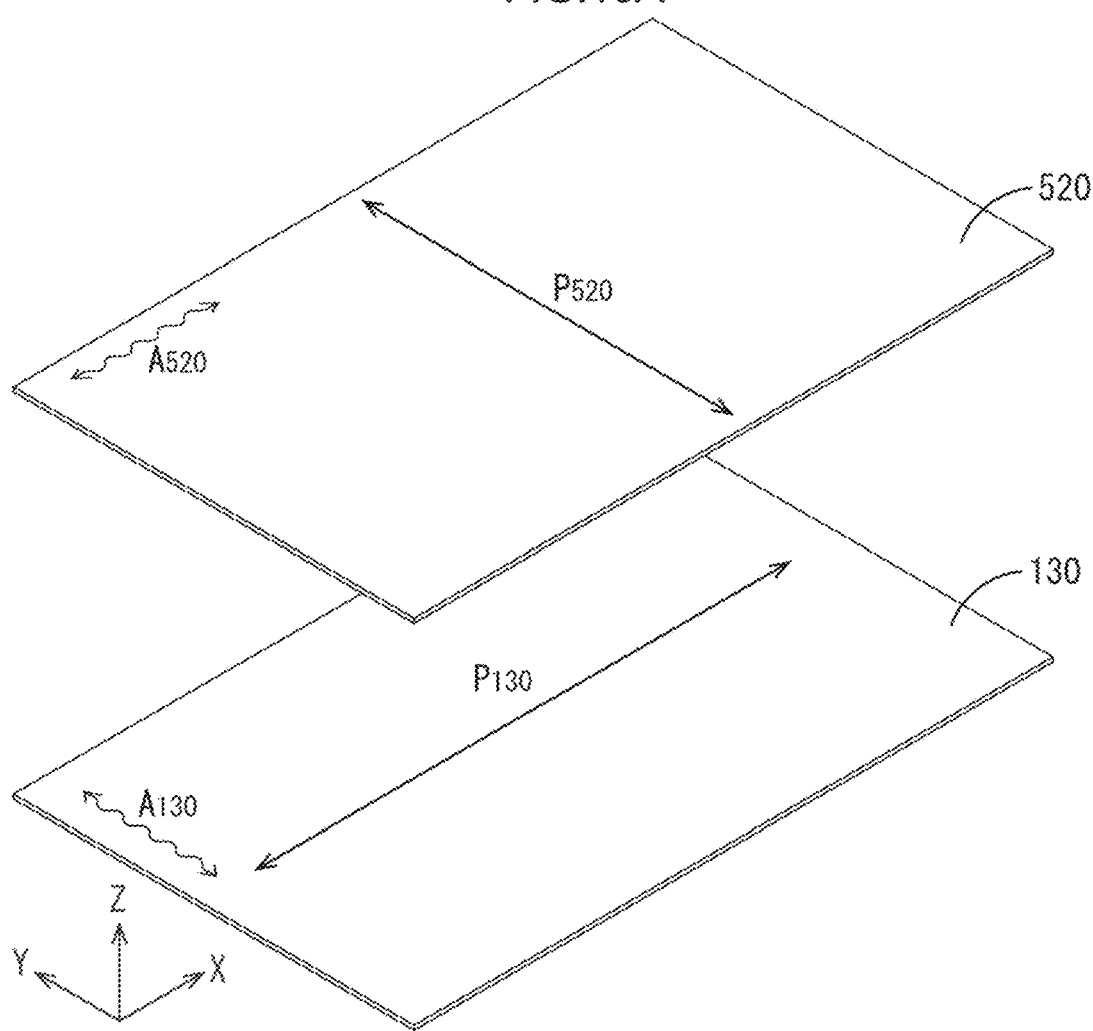
FIG. 10A is a schematic diagram for explaining optical alignment treatment on a CF substrate and a TFT substrate in Example 5.
Figure 10B:
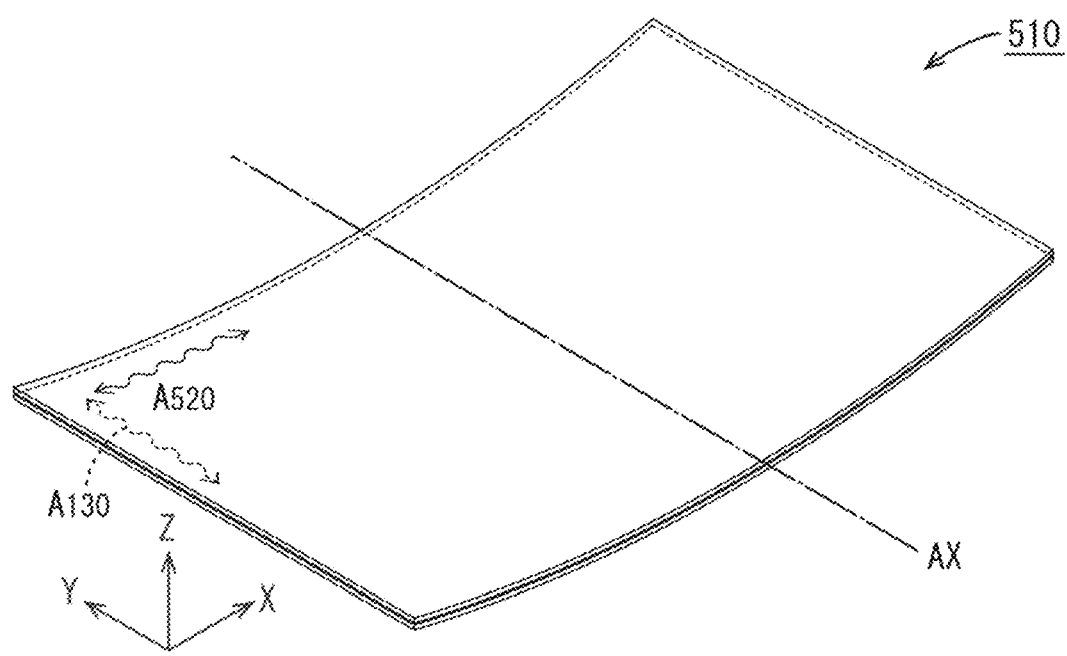
FIG. 10B is a schematic diagram for explaining an appearance in which the CF substrate and the TFT substrate subjected to the optical alignment treatment are bonded to each other and curved.

A liquid crystal display device according to Example 5 was manufactured in the same manner as Example 1 except that the alignment direction of the alignment film on the CF substrate side was changed. Specifically, as shown in FIG. 10A, a polarization direction $P_{520}$ of linearly polarized ultraviolet light irradiated when the optical alignment treatment of the alignment film formed on a CF substrate 520 is performed was parallel to the Y axis (curved axis AX). Note that the polarization direction $P_{130}$ of the linearly polarized ultraviolet light irradiated when the optical alignment treatment of the alignment film formed on the TFT substrate 130 is performed was kept parallel (vertical direction D1) to the X axis. By doing so, as shown in FIG. 10B, the liquid crystal material with positive dielectric anisotropy is aligned in a twisted state of approximately 90° when viewed from a normal direction of the two substrates 520 and 130, a liquid crystal panel 510 driven in the TN mode was manufactured, and the liquid crystal display device according to Example 5 including the liquid crystal panel 510 was obtained.

(Results of Evaluation on Occurrence of Bright Spot in Example 5)

In the liquid crystal display device according to Example 5, the occurrence of the bright spots was evaluated by visual inspection in the same manner as in Example 1 and the like, but the bright spot defects were not observed. Since the film scraping due to the spacer mainly occurs in the alignment film provided on the substrate (in the case of Example 5, the TFT substrate 130) side on which the tip of the spacer abuts, in the alignment film on the same substrate side, if the polymer is aligned perpendicularly to the direction in which the frictional force F acts, the film scraping can be reduced and the occurrence of the bright spots can be suppressed. In Example 5, in the alignment film on the CF substrate 520 side, the alignment direction $A_{520}$ of the polymer P1 is perpendicular to the curved axis AX, whereas in the TFT substrate 130, the alignment direction $A_{130}$ of the polymer P1 in the alignment film is kept parallel (perpendicular to the direction in which the frictional force F acts) to the curved axis AX. Thus, it was confirmed that the present technology can be preferably applied even to the liquid crystal panel 510 driven in the TN mode manufactured in Example 3.

Example 6

Figure 11:
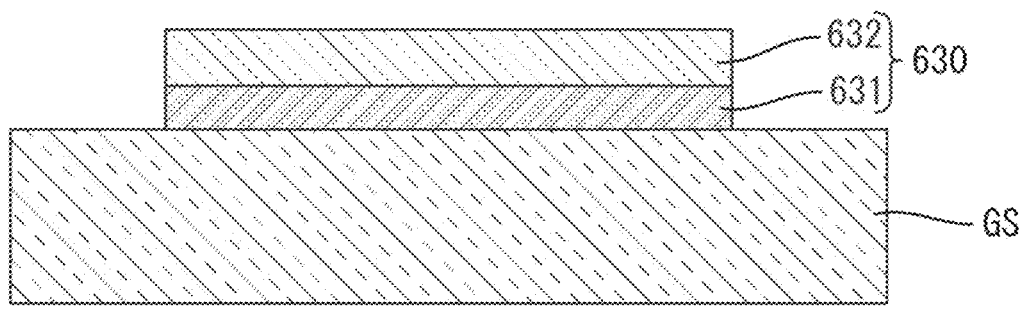
FIG. 11 is a schematic diagram for explaining manufacturing of a flexible substrate in Example 6.

As the light transmitting substrate, a flexible substrate made of a polyimide film is used instead of a glass substrate, and the panel manufacturing process is performed under the same conditions as in Example 1, so that a bendable film-shaped liquid crystal panel was manufactured and a liquid crystal display device according to Example 6 including the liquid crystal panel was manufactured. Specifically, as shown in FIG. 11, a polyimide film 631 having a thickness of 100 μm is formed on a glass substrate GS, and an IPS electrode structure 632 similar to that of Example 1 such as a TFT is formed on a polyimide film 631, so that a TFT substrate 630 is formed. Similarly, the spacer 141 or the like was formed on the polyimide film to form the CF substrate. In addition, in Example 1, thin polishing processing was performed on the light transmitting substrate made of glass, but in Example 6, instead of this, the glass substrate GS and the polyimide film 631 are separated by irradiating with a laser from the back surface of the glass substrate GS, so that a liquid crystal cell including the polyimide film 631 or the like as the light transmitting substrate was obtained. The liquid crystal panel according to Example 6, which is manufactured in this manner, is a flexible liquid crystal panel having flexibility and formed to be bendable around the curved axis AX.

(Evaluation Method 3: Evaluation on Occurrence of Bright Spot after Repeated Bending Test)

The flexible liquid crystal panel manufactured in Example 6 is curved from a flat plate state to a curvature of 2000R (mm) and then was repeatedly subjected to a bending test 100 times, and for the liquid crystal display device according to Example 6 including the flexible liquid crystal panel after the test, the evaluation on the occurrence of the bright spots was performed by visual inspection in the same manner as Example 1 and the like.

(Results of Evaluation on Occurrence of Bright Spot after Repeated Bending Test in Example 6)

For the liquid crystal display device according to Example 6, the evaluation on the occurrence of the bright spots after the repeated bending test was performed, so that the bright spot defects were not recognized. The liquid crystal display device according to Example 1 includes a hard glass substrate as the light transmitting substrate, and is used in a fixed shape with a predetermined curvature. On the other hand, the liquid crystal display device according to Example 6 includes a flexible substrate having flexibility as the light transmitting substrate, and can be used as a bendable display or a roll-shaped display which is bendable during use (see FIGS. 2 and 3). According to such a liquid crystal display device, it is possible to view an image in a flat plate shape or in a curved state. Since these bendable liquid crystal panels are applied with bending stress even during use after being manufactured, these bendable liquid crystal panels need to have even better strength against scraping, but the present technology is very useful for these bendable liquid crystal panels. Note that a heat absorption layer may be provided between the polyimide film 631 and the glass substrate GS in the manufacturing of the flexible substrate, and furthermore a moisture proof layer may be provided between the polyimide film 631 and the IPS electrode structure 632 including a TFT or the like.

The invention claimed is:

1. A liquid crystal panel including a display surface displaying an image, the liquid crystal panel comprising:
   a pair of substrates including a first substrate having a first opposing surface and a second substrate having a second opposing surface, the first substrate and the second substrate being disposed to face each other in a state where the first opposing surface and the second opposing surface are opposite and spaced apart from each other;
   a liquid crystal layer disposed between the pair of substrates;
   a spacer provided on the first opposing surface of the first substrate; and
   an alignment film provided on the second opposing surface of the second substrate, wherein:
   the display surface is curved around a curved axis or formed to be bendable around the curved axis,
   the spacer directly or indirectly abuts on the alignment film,
   the alignment film is a horizontal alignment film that contains a polymer having an alkylene chain structure having two or more carbon atoms in a main chain and allows liquid crystal molecules in the liquid crystal layer to be aligned horizontally to the alignment film,
   the polymer has at least one photofunctional group in the main chain, the main chain is aligned and arranged in one direction, and
   the polymer is aligned such that the alkylene chain structure extends parallel to the curved axis.

2. The liquid crystal panel according to claim 1, wherein the liquid crystal panel is to be driven in an IPS mode, an FFS mode, an OCB mode, or a TN mode.

3. The liquid crystal panel according to claim 1, wherein the alignment film is a horizontal optical alignment film having the at least one photofunctional group selected from the group consisting of cyclobutane, azobenzene, chalcone, cinnamate, coumarin, and stilbene.

4. The liquid crystal panel according to claim 3, wherein the alignment film is subjected to optical alignment treatment by irradiation of polarized ultraviolet light polarized in a vertical direction perpendicular to the curved axis.

5. The liquid crystal panel according to claim 1, wherein a retardation of the alignment film is 1 nm or more.

6. The liquid crystal panel according to claim 1, wherein the spacer surface-abuts on the alignment film.

7. The liquid crystal panel according to claim 1, wherein each of the pair of substrates is a flexible substrate having flexibility.

8. A liquid crystal display device comprising the liquid crystal panel according to claim 1.

\* \* \* \* \*